United States Patent [19]
Quaas

[11] 3,986,842
[45] Oct. 19, 1976

[54] MULTI-COMPONENT METAL COATING CONSUMABLE

[75] Inventor: Joseph F. Quaas, Island Park, N.Y.

[73] Assignee: Eutectic Corporation, Flushing, N.Y.

[22] Filed: June 17, 1975

[21] Appl. No.: 587,682

[52] U.S. Cl. .............................. 29/191.2; 29/191; 29/192 R; 164/97; 219/76; 219/145; 219/118
[51] Int. Cl.² ............................................. B23P 3/20
[58] Field of Search.............. 29/191, 191.2, 191.4, 29/192 R, 192 CP, 191.6; 228/903, 127, 122; 219/76, 145, 140, 118; 164/97

[56] References Cited
UNITED STATES PATENTS

| | | | |
|---|---|---|---|
| 3,455,019 | 7/1969 | Quaas | 228/122 |
| 3,511,968 | 5/1970 | Helm | 219/146 |
| 3,523,569 | 8/1970 | Quaas | 164/97 |
| 3,583,471 | 6/1971 | Kemming | 29/191.2 |
| 3,633,063 | 1/1972 | Ando | 219/145 |

FOREIGN PATENTS OR APPLICATIONS
992,480  5/1965  United Kingdom.............. 219/146

Primary Examiner—L. Dewayne Rutledge
Assistant Examiner—Michael L. Lewis
Attorney, Agent, or Firm—Hopgood, Calimafde, Kalil, Blaustein and Lieberman

[57] ABSTRACT

A multi-component metal coating consumable is provided in the form of a rod comprised of two different rod portions coaxially butt joined together in end-to-end relationship, one of said rod portions being a composite consisting essentially of at least 10% by weight of coarse particles of a refractory carbide dispersed through an alloy matrix, the other of said rod portions comprising a compatible alloy matrix structure, such that a welding or brazing rod is provided having two working ends, one to augment the other during the application of a hard and wear resistant coating to a metal substrate.

14 Claims, 9 Drawing Figures

U.S. Patent  Oct. 19, 1976  3,986,842
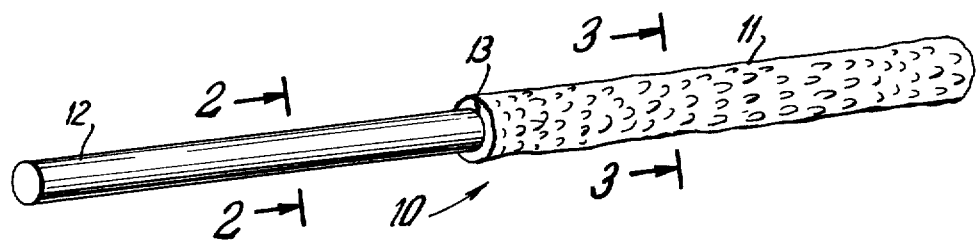
FIG.1
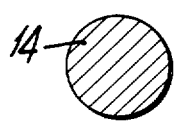
FIG.2
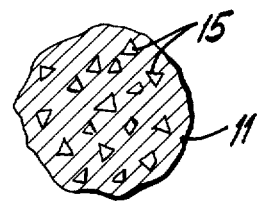
FIG.3
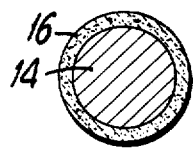
FIG.4
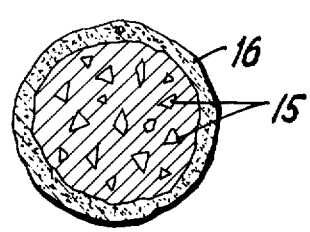
FIG.5
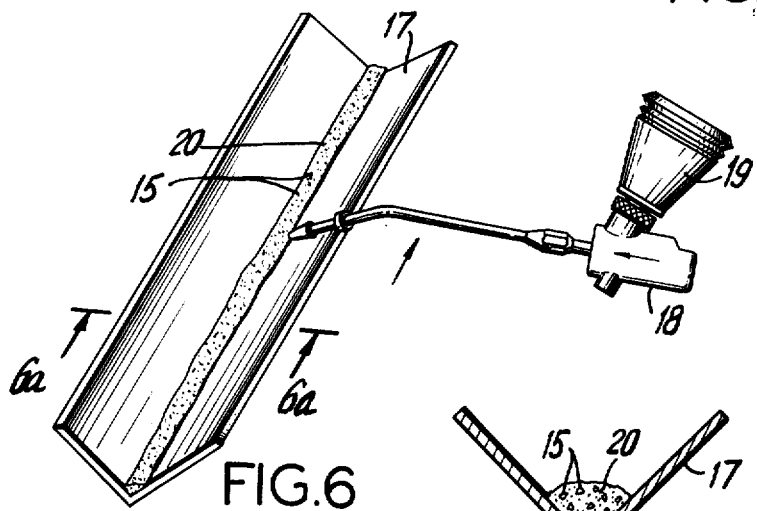
FIG.6
FIG.6a
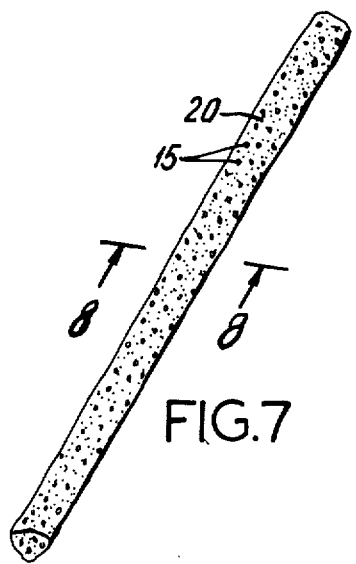
FIG.7
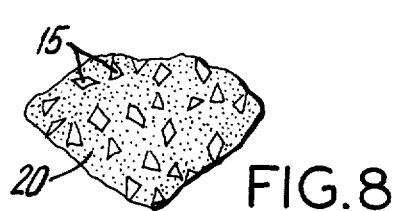
FIG.8

MULTI-COMPONENT METAL COATING CONSUMABLE

This invention relates to a multi-component metal coating consumable in the form of a welding or brazing rod and, in particular, to a rod comprised of two different rod portions coaxially butt joined together, one of said rod portions being a composition comprising coarse particles of a refractory carbide dispersed through an alloy metal matrix, the other rod portion comprising a compatible alloy matrix structure.

STATE OF THE ART

In my U.S. Pat. Nos. 3,304,604 and 3,523,569 (division of U.S. Pat. No. 3,304,604), I disclose a method for producing carbide-containing rods for use in subsequently providing hard facing coatings on metal substrates. Both of these patents are incorporated herein by reference.

The methods disclosed in these patents enable the production rods comprising coarse particles of refractory carbides, e.g. particles of tungsten carbide sintered together with cobalt as a binder metal. Pieces of the foregoing carbide are generally available in the form of scrap. In producing composite rods of this type, it is important that the coarse particles of the carbide be protected against oxidation.

Thus, a preferred method in producing the composite rod having the desired quality is to provide a row of said coarse particles of refractory carbide in a V-groove channel and then applying a molten matrix alloy by means of a flame spray torch by making a rapid first pass with the flame spray torch to thereby surround the coarse particles with a thin coating of said relatively low melting matrix alloy to protect them from heat and oxidation. The first pass is then followed by a rapid succession of passes with the flame spray torch, thereby building up the matrix until a composite rod is produced in which the coarse carbide particles are substantially uniformly dispersed or distributed through the alloy matrix. This method will later be described in the carrying out of the present invention.

As stated in the foregoing patents, the resulting composite rod may comprise coarse particles ranging up to about ⅜ inch in size, the amount of carbide being as little as 10% by weight, the range generally being about 60 to 75% by weight of carbide particles and 25% to 40% by weight of matrix metal.

Large amounts of carbides are usually preferred where the aplication involves the treatment of metal substrates to produce cutting or wear resistant surfaces on mining equipment, e.g. rotary cutting bits, fishing tools and the like, or in equipment used for drilling (e.g. oil drilling equipment), boring, reaming, earth removing, burning shoes, casing tools, bucket teeth and the like.

In hardfacing a metal substrate using a composite rod of the foregoing type highly loaded with, for example, pieces of sintered tungsten carbide, the deposit may tend to become too enriched in the carbide due to the tendency of the molten matrix metal to flow away from the site during the application of the carbide-matrix metal composition. Such enrichment in carbide may lead to poor anchoring of the particles to the metal substrate.

Thus, it would be desirable to have a composite rod that has included with its structure the means by which the fore-going problem can be alleviated. It would also be desirable to have an improved multi-component welding or brazing rod in which the rod is characterized by means for applying a compatible matrix metal composition with or without metal carbide to augment the application of the refractory carbide-matrix metal composition.

OBJECTS OF THE INVENTION

It is thus the object of the invention to provide a new and improved welding or brazing rod for hard facing metal substrate.

Another object is to provide a multi-component metal coating consumable in the form of rod characterized by two different rod portions coaxially butt joined together in end-to-end relationship, one of said rod portions being a composite of coarse particles of a refractory carbide dispersed through a metal matrix, the other portion comprising a compatible metal matrix structure. By "compatible matrix metal structure" is meant a portion comprised essentially of a compatible matrix alloy alone or a matrix alloy containing a relatively fine dispersion of refractory carbide particles.

These and other objects will more clearly appear from the following disclosure and claims and the accompanying drawing wherein:

FIG. 1 depicts a perspective view of the improved multi-component metal coating consumable provided by the invention;

FIGS. 2 to 5 are cross sections of portions of the consumable of FIG. 1 with and without a flux coating; and FIGS. 6 to 8 are illustrative of a technique for producing a refractory carbide-metal matrix composite rod.

BROAD STATEMENT OF THE INVENTION

Stating it broadly, the invention is directed to a multi-component metal coating consumable in the form of a rod comprised of two different rod portions coaxially butt joined together in end-to-end relationship, one of said rod portions being a composite consisting essentially of at least 10% by weight of coarse particles of a refractory carbide dispersed through an alloy matrix, the other of said rod portions comprising a compatible alloy matrix structure, such that a duplex welding or brazing rod is provided having two working ends, one to augment the other during the application of a hard and wear resistant coating to a metal substrate.

It is important that the rod portion comprising a matrix metal structure be compatible with the matrix metal in the coarse carbide composite portion. In one preferred embodiment, the matrix metals at both ends of the rod are the same. In another embodiment, the end comprising essentially the alloy matrix (that is, with or without fine carbide dispersion) need not be the same as the matrix metal in the coarse carbide composite end so long as it is compatible with the matrix metal of said composite end.

For example, in the case where the relatively coarse carbide pieces are made of tungsten carbide sintered with a binder metal, e.g. 5% to 20% by weight of cobalt, the matrix metal through which the sintered carbide is dispersed may preferably be nickel silver. A preferred nickel silver composition is one containing by weight about 9% to 11% Ni (may range broadly from about 2% to 20%), 40% to 52% Cu (may range broadly from about 40% to 65%) and the balance essentially zinc (e.g. about 28% to 58%). Up to 0.25% P may be present.

A matrix metal which is compatible with a nickel silver matrix is one containing about 15% Cr, about 4% Si, about 3.5% B, about 4% Fe and the balance essentially nickel, the melting point ranging from about 1900° to 1950° F (1038° to 1065° C). This compatible matrix metal would be used after laying down the tungsten carbide-nickel silver deposit. After this hard facing coating has been applied, the other end of the welding or brazing rod consisting essentially of the aforementioned nickel-base compatible matrix metal would then be used as a working end to apply the nickel-base alloy as a superimposed coating providing an overlayer having a hardness of about 58 to 60 Rockwell C.

Broadly stated, the matrix metal may be selected from the group consisting of copper-base, nickel-base and cobalt-base alloys having a relatively low melting point ranging from about 1600° to 2100° F (about 870° to 1150° C).

The advantages of the invention will more clearly appear from the following details of the various embodiments.

DETAILS OF THE INVENTION

Referring to FIG. 1, a multi-component metal coating consumable 10 is shown comprised of two different rod portions 11 and 12 coaxially butt jointed at 13 by brazing or other suitable method, the portion 11 being a composite of sintered tungsten carbide pieces dispersed through an alloy matrix, e.g. nickel silver, the portion 12 in this case being made of the same nickel silver composition.

Thus, taking a view along line 2—2 of rod portion 12 of FIG. 1, a cross section is obtained typical of the matrix metal alloy 14. A section 3—3 across the composite of rod portion 11 (FIG. 3) shows a dispersion of pieces of tungsten carbide 15 in the matrix metal alloy.

As has been stated hereinbefore, the whole rod may or may not be flux coated. Such coatings 16 are shown on both portions of the multi component metal coating consumable or rod 10.

One method which may be employed in producing the composite portion of the rod of the invention is covered in quite some detail in my U.S. Pat. Nos. 3,304,604 and 3,523,569.

Thus, referring to FIG. 6, an angle iron is shown being used as a mold into which coarse particles of refractory carbide 17 are disposed along the V-groove (note FIG. 6a also). A spray torch 18 carrying a powder dispenser 19 in which is contained the matrix alloy is sprayed onto the carbide particles by an oxy-acetylene flame which melts the matrix alloy 20. The flame spray torch is moved along the length of the mold to keep the matrix metal molten so that it surrounds particles 15 to form a composite rod. Once the carbide particles are covered with the molten matrix alloy in the initial pass, the carbide is protected against oxidation. By means of the successive passes, the temperature of the carbide particles is maintained as low as possible consistent with obtaining infiltration of molten alloy matrix into the interstices of the particles. Thus, there is obtained a slow build up of alloy matrix on and around the particles in the mold to produce the composite rod shown in FIG. 7 having the carbide particles dispersed substantially uniformly through the matrix as shown in the cross section of FIG. 8 taken along line 8—8 in FIG. 7.

In the above description, angle iron 17 has been indicated as the mold used to form the composite rod. It is obvious that other molds of suitable size and shape may be employed according to the ultimate use intended. The molds may be of any suitable material which is resistant to heat. Suitable materials including graphite and ceramic as well as the angle iron illustrated in the figures. The angle iron may have its ends closed by a suitable jigging material. The mold may further be preheated prior to the formation of the composite rod.

Refractory carbides which may be used in the present invention include carbides of titanium, zirconium, vanadium, chromium, molybdenum, tungsten, tantalum and columbium. These refractory carbides may be used along or in combination with one another. It has been found that tungsten carbide is a particularly preferred refractory carbide. It has been additionally found that cast tungsten carbide provides a higher resistance to abrasion and wear than rods formed from sintered carbide.

Sintered tungsten carbide pieces may contain 2.5 to 30% by weight of binder metal, e.g. cobalt binder, and generally from about 5% to 20% by weight of binder metal. Sintered tungsten carbide may contain up to about 30% by weight of other carbides set forth hereinabove.

The particle size of the refractory carbides used according to the invention varies depending on the ultimate utility desired. Particle sizes of about 60 mesh (U.S. Standard) to about ⅜ inch and angular in respect to shape are preferably used for superior cutting and drilling performance. Carbide particles in the 20 to 40 mesh (U.S. Standard) range are employed for wear and abrasion resisting applications.

The percentage ratios of refractory carbide particles to matrix alloy will again depend on the individual requirements of the user. Naturally, the higher the proportion of carbide particles, the more wear resistant and the better the cutting qualities result. Generally, improvement is noted with as little as 10% carbide particles on a weight basis. The upper limit of weight percent carbide particles depends primarily only on having sufficient matrix alloy to firmly bond the particles. As little as 5% matrix alloy on a weight basis has been found useful for some applications. For example, the composition may comprise between 50% and 80% carbide particles to 20–50 percent matrix alloy on a weight basis.

A preferred composition range is one containing 60% to 75% of refractory carbide particles to 25 to 40% by weight of matrix metal.

Suitable matrix alloys are well known in the art. Generally speaking, matrix alloys having a predominate amount of nickel, iron, copper or cobalt characterized as nickel, iron, cobalt or copper-base alloys have been found particularly useful.

The compositions of such alloys are selected to provide a melting point falling within the range of about 1600° to 2100° F (about 870° to 1150° C). Copper-nickel alloys have been used for applying overlays to various parent metals. Nickel-silver and other brass types of alloys have further been used. Matrix alloys containing a relatively high zinc content are subject to fuming and vaporization when heat is applied and this constitutes somewhat of a health hazard.

An alloy matrix containing predominately a metal of the iron-cobalt-nickel group has been found useful according to this invention. A suitable example of this type of base alloy is as follows:

NICKEL-BASE MATRIX ALLOY

| Constituent | Range in percent by Weight | Example |
|---|---|---|
| Silicon | 1.5 – 5.0 | 3.0 |
| Boron | 1.5 – 5.0 | 2.0 |
| Chromium | 0 – 20 | 1.0 |
| Molybdenum | 0 – 7 | 0.2 |
| Nickel | (1) | (1) |

[1]Essentially the Balance

The above alloy may be substituted in nickel content by cobalt or iron. Also, an alloy of this type can consist as a matrix plus up to 80% by weight of tungsten carbide particles in a fine particle size ranging from about 60 microns to 1200 microns to effect an extremely abrasion resistant matrix for holding or retention of the large sized sintered carbide fragments. The term "matrix metal structure" includes the foregoing type of matrix metal mixtures. The following matrix alloy is also illustrative of compositions found useful.

COBALT-BASE MATRIX ALLOY

| Constituent | Range in percent by Weight | Example |
|---|---|---|
| Nickel | 1.0 – 5.0 | 3.0 |
| Chromium | 26.10 – 32.0 | 28.0 |
| Silicon | 0.5 – 3.0 | 1.0 |
| Boron | 1.0 – 3.0 | 2.0 |
| Carbon | 0.8 – 2.0 | 1.0 |
| Tungsten | 3.5 – 7.5 | 4.5 |
| Molybdenum | 0.0 – 0.5 | 3.0 |
| Cobalt | (1) | 57.5 |

[1]Essentially the Balance

Again, nickel or iron may be substituted in the above formulation for a like amount of cobalt. The iron alloy is harder and more resistant than the other but is more subject to corrosion and oxidation during deposition.

A particularly preferred copper base matrix alloy containing no zinc which has been found useful has the following constituents in percentages by weight as indicated:

COPPER-BASE ALLOY

| Constituent | Broad Range | Intermediate Range |
|---|---|---|
| Nickel | 15.0 – 40.0 | 20 – 25 |
| Silicon | 1.0 – 5.0 | 3.0 – 4.0 |
| Boron | 0.15 – 2.50 | 0.25 – 0.5 |
| Manganese | 0.20 – 2.00 | 0.5 – 1.0 |
| Copper | (1) | (1) |

[1]Essentially the Balance

As an example of a matrix alloy within the above ranges, there may be mentioned:

| Constituents | Percent by Weight |
|---|---|
| Nickel | 23.00 |
| Silicon | 3.45 |
| Boron | 0.47 |
| Manganese | 0.75 |
| Copper | (1) |

[1]Essentially the Balance

As stated hereinbefore, nickel silver is particularly desirable as a matrix alloy and may range broadly in composition by weight from about 2% to 20% nickel, 28% to 58% zinc, 0.01% to 1.0% silicon, 0.0 to 1.0% silver and the balance essentially copper (e.g. about 40% to 65%).

The above illustrated iron, cobalt, copper and nickel-base alloys are particularly useful because they melt at relatively nickel-base temperatures. Thus, by using these low temperature matrix alloys, the heat initially used in the melting of the alloys is low and the individual particles are not subject to contact with extremely high heat. The initial low temperatures used combined with the coating and protecting effect of successive passes with the flame spray torch and the easily dissipated heat provide a particularly effective method of preventing oxidation, cracking and solutioning. Additionally, these compositions firmly bind the carbide particles to the parent material. When the composite rod is ultimately deposited, a hard, shockproof surface is provided and the particles are not easily dislodged.

As stated hereinabove, the advantage of having a duplex rod having two working ends, one for depositing matrix alloy alone, the other for depositing the composite material, is that one can augment the other in the production of the ultimate coating desired.

For example, if the carbide loading is too high in the initial deposit using the composite end of the rod, then the rod need merely be turned around and the matrix metal end used to deposit matrix metal on top of the excess carbide to further dilute its composition. In this instance, the matrix metal end of the rod will generally have substantially the same composition as the matrix metal in the composite.

However, where the purpose is to use a matrix alloy at the matrix metal end of the rod which is different from but compatible with the matrix alloy in the composite for the purpose of covering the deposited hard facing coating (the composite) with a hard overlying metal coating, this can be done merely by turning the rod around to the matrix alloy and using it as a welding or brazing rod to cover the solidified hard facing coating as described hereinbefore.

In another instance, the duplex rod is employed where the metal substrate surface is somewhat dirty. In this case, a flux coated rod is used, the matrix alloy end being used first to produce a clean matrix alloy coating on the metal substrate, following which the hard facing coating is applied by using the composite end.

The flux coating employed may run the gamut of the fluxes normally employed for welding and/or brazing. The preferred fluxes are the borate-based fluxes selected from the group consisting of borates of the alkali metals sodium, potassium and lithium and the alkaline earth metals calcium, strontium, barium and the like. Such fluxes are well known to those skilled in the art.

As illustrative of the invention, the following examples are given:

EXAMPLE 1

An oil drilling stabilizer (a wear resistant sleeve) which forms part of the drill pipe assembly in oil drilling equipment is rendered abrasive-resistant at the outer surface thereof by applying several coating stripes along the length of the sleeve at, for example, 120° intervals to provide three coating stripes having marked resistance to abrasion and high compressive trength. The sleeve is made of high strength low alloy teel (type 4140).

A multi-component metal coating consumable of the nvention is used in the form of a duplex rod, with a first od portion formed of a composite about 50% by veight of sintered fragmented tungsten carbide of ibout minus one-eighth inch to plus one-sixteenth inch iize dispersed through a matrix alloy of a nickel-base illoy containing 0.7% C, 15% Cr, 4% Si, 3.2% B, 4% Fe ind the balance essentially nickel.

The second rod portion is made of said matrix alloy (0.7% C, 15% Cr, 4% Si, 3.2% B, 4% Fe and the balance essentially nickel) and is coaxially butt brazed to he composite rod portion, the second rod portion of said matrix alloy being flux-coated.

In producing the abrasive resistant stripes on the steel sleeve, the matrix alloy end of said duplex rod (second rod portion) is first applied as a pre-wetting and cleaning alloy on the stripe areas to provide a wettable compatible precoated surface for receiving the composite composition in bonding relationship therewith, the pre-wetting matrix alloy being applied at a temperature of 1900° F (1038° C). Following the application of the matrix metal layer, then the other end of the duplex rod, the composite alloy end, is brought into play and an overcoat of the composite alloy applied containing the coarse-grained fragmented tungsten carbide at about 1900° F. A strong bond is obtained to the substrate, the resulting oil drilling stabilizer being characterized by markedly improved resistance to abrasion during rotation.

The first coating metal with the relatively high boron and silicon contents provides good wetting and cleaning of the low alloy (type 4140) steel substrate.

EXAMPLE 2

A hollow coring drilling bit (type 4140 steel) having a serrated teeth structure arranged peripherally at its end is similarly coated with a hard layer as follows.

A multi-component metal coating consumable of the invention is likewise used in the form of a duplex rod, with a first rod portion being a composite and comprising 60% by weight of sintered carbide fragments of about minus three-sixteenths of an inch and plus one-eighth inch in size dispersed through a metal matrix containing 48% Cu, 10.5% Ni, 0.1% Si, 0.05% P, 0.3% Ag and the balance essentially zinc.

The second rod portion is made of the same matrix metal, that is, it contains 48% Cu, 10.5% Ni, 0.1% Si, 0.05% P, 0.3% Ag and the balance essentially zinc and is butt-end brazed coaxially to the composite rod portion.

First, in coating the serrated teeth, the matrix alloy end (the second rod portion) is first applied to the exposed surface of the teeth as a pre-wetting and cleaning alloy to provide a compatible substrate to receive the composite alloy-end of the brazing rod, the matrix alloy rod portion being flux-coated in accordance with well known fluxing procedures. The pre-wetting and cleaning alloy is applied at a temperature of about 1750°–1800° F (955° to 982° C). Following the application of the matrix alloy layer, then the other end of the duplex rod, the composite alloy end, is brought into play and an overcoat of the composite alloy applied containing the coarse grained sintered tungsten carbide fragments, the temperature of application being about 1750° to 1800° F. The carbide composite layer adheres strongly to the serrated teeth and provides good abrasion resistance during coring.

EXAMPLE 3

A steel sleeve (e.g. type 4140 low alloy steel) for use as a hole opener for oil field use is provided with four stripe coatings arranged longitudinally along the outer surface of the sleeve disposed radially about 90° from each other.

The multi-component metal coating consumable employed comprises a duplex rod, with a first rod portion being a composite and comprising by weight of coarse fragments 65% by weight of sintered tungsten carbide of about minus three-eigths to plus one-quarter inch in size dispersed through a matrix containing 48% Cu, 10.5% Ni, 0.1% Si, 0.05% P, 0.3% Ag and the balance essentially zinc.

The second rod portion is made of 60% by weight of fine tungsten carbide particles ($WC/W_2C$) produced by adding tungsten to molten iron containing 4.2% C which produces said $WC/W_2C$ in situ after casting. The cast carbide material is ground to a size range of 60 to 1200 microns and the cast carbide combined with a compatible matrix metal in a proportion to provide 60% by weight of the carbide dispersed through a matrix metal containing 6% Cr, 2.5% B, 0.1% C, 3% Si, 3.5% Fe and the balance essentially nickel. The carbide in the matrix ranges in the aforementioned size range of about 60 to 1200 microns.

In producing the wear resistant stripes on the surface of the hole opener component (the steel sleeve), the first rod portion with the coarse carbide particles dispersed through the copper-base matrix alloy is employed to coat the component sleeve with four stripes of said composite disposed radially 90° apart around said sleeve's outer surface. This layer is laid down at a temperature of about 1750° to 1800° F (955° to 982° C).

Following the application of the foregoing basis layer, the other end of the duplex rod is brought into play and the nickel-base alloy with the finely dispersed carbide deposited as a thin layer at 1950° F (1066° C) over the first applied layer containing the coarse carbide particles. The thin layer adheres strongly to the basis layer and provides a two-ply layer with improved resistance to abrasion on said hole opener component or sleeve.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. As an article of manufacture, a multi-component metal coating consumable in the form of a rod comprised of two different rod portions coaxially butt joined together in end-to-end relationship to form a duplex rod, one of said rod portions being a composite consisting essentially of at least 10% by weight of coarse particles of a refractory carbide ranging in size from about 60 mesh to ⅜ inch substantially uniformly dispersed through a matrix alloy, the other of said rod portions comprising a matrix alloy structure compatible with the matrix alloy of said composite, such that a welding or brazing rod is provided having two working ends, one to augment the other when applying a hard and wear resistant coating to a metal substrate.

2. The article of manufacture of claim 1, wherein the matrix alloy in the composite end portion and in the alloy matrix end portion has a melting point ranging from about 1600° to 2100° F (870° to 1150° C).

3. The article of manufacture of claim 2, wherein the matrix alloy is selected from the group consisting of iron-base, cobalt-base, nickel-base and copper-base alloys.

4. The article of manufacture of claim 3, wherein the rod portion comprising said compatible matrix alloy structure is different from the matrix alloy in the composite end of the rod.

5. The article of manufacture of claim 4, wherein said compatible matrix alloy structure contains a fine dispersion of refractory carbide particles ranging from about 60 to 1200 microns in size.

6. The article of manufacture of claim 3, wherein the matrix alloy in both rod portions is nickel silver.

7. The article of manufacture of claim 5, wherein the nickel silver matrix alloy contains about 2.0% to 20.0% Ni, 28.0% to 58.0% Zn and the balance essentially copper.

8. As an article of manufacture, a multi-component metal coating consumable in the form of a rod comprised of two different rod portions coaxially butt joined together in end-to-end relationship to form a duplex rod, one of said rod portions being a composite consisting essentially of at least 10% by weight of coarse particles of a refractory carbide of size ranging from about 60 mesh to ⅜ inch substantially uniformly dispersed through a matrix alloy, the other of said rod portions comprising a matrix alloy structure compatible with the matrix alloy of said composite and selected from the group consisting of iron-base, nickel-base, cobalt-base and copper-base alloys having a melting point ranging from about 1600° to 2100° F (870° to 1150° C), such that a welding or brazing rod is provided having two working ends, one to augment the other when applying a hard and wear resistant coating to a metal substrate.

9. The article of manufacture of claim 8, wherein the rod portion comprising the compatible matrix alloy structure is different from the matrix alloy in the composite end of the rod.

10. The article of manufacture of claim 9, wherein said compatible matrix structure contains a fine dispersion of refractory carbide particles ranging from about 60 to 1200 microns in size.

11. The article of manufacture of claim 8, wherein the nickel-base matrix alloy contains about 1.5 to 5% Si, about 1.5 to 5% B, up to about 20% Cr, up to about 7% Mo and the balance essentially nickel.

12. The article of manufacture of claim 8, wherein the cobalt-base matrix alloy contains about 1 to 5% Ni, about 26% to 32% Cr, about 0.5 to 3% Si, about 1 to 3% B, about 3.5% to 7.5% W, up to about 0.5% Mo and the balance essentially cobalt.

13. The article of manufacture of claim 8, wherein the copper-base alloy contains about 15 to 40% Ni, about 1 to 5% Si, about 0.15 to 2.5% B, 0.2 to 2% Mn and the balance essentially copper.

14. The article of manufacture of claim 8, wherein the copper-base alloy is a nickel silver alloy containing about 2.0% to 20.0% Ni, 28.0% to 58.0% Zn and the balance essentially copper.

* * * * *